United States Patent
Morishima et al.

(10) Patent No.: US 8,642,209 B2
(45) Date of Patent: Feb. 4, 2014

(54) NON-AQUEOUS ELECTROLYTE SECONDARY BATTERY, ELECTRODE USED FOR SECONDARY BATTERY, AND METHOD OF MANUFACTURING ELECTRODE

(71) Applicant: Hiroshi Miyauchi, Tokyo (JP)

(72) Inventors: Hideaki Morishima, Saku (JP); Takashi Kobayashi, Shibukawa (JP); Seiichi Hikata, Takasaki (JP); Yoshikazu Kobayashi, Saku (JP); Takahisa Ohsaki, Yokohama (JP); Natsuki Toyota, Takasaki (JP); Haruchika Ishii, Saku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/670,109

(22) Filed: Nov. 6, 2012

(65) Prior Publication Data

US 2013/0065124 A1     Mar. 14, 2013

Related U.S. Application Data

(62) Division of application No. 12/568,103, filed on Sep. 28, 2009, now Pat. No. 8,334,071.

(30) Foreign Application Priority Data

Sep. 29, 2008    (JP) ................................. 2008-250231
Sep. 30, 2008    (JP) ................................. 2008-255198

(51) Int. Cl.
    *H01M 4/02*       (2006.01)
    *H01M 4/13*       (2010.01)
    *H01M 4/139*      (2010.01)
    *H01M 2/26*       (2006.01)
    *H01M 4/04*       (2006.01)

(52) U.S. Cl.
    USPC ........... 429/211; 429/209; 429/233; 26/623.5

(58) Field of Classification Search
    USPC .................... 429/60, 209, 211, 233; 29/623.5
    See application file for complete search history.

(56) References Cited

U.S. PATENT DOCUMENTS 6,235,426 B1 *  5/2001  Yanai et al. ................... 429/211
7,211,350 B2 *  5/2007  Amatucci ................ 429/231.95

(Continued)

FOREIGN PATENT DOCUMENTS

JP       7-211315 A     8/1995
JP      10-214616 A     8/1998

(Continued)

OTHER PUBLICATIONS

IPDL Machine Translation of the Detailed Description of JP 2006-139919 (Jun. 2006).*

(Continued)

*Primary Examiner* — Gregg Cantelmo
(74) *Attorney, Agent, or Firm* — Oblon, Spivak, McClelland, Maier & Neustadt, L.L.P.

(57) ABSTRACT

A non-aqueous electrolyte secondary battery includes an electrode body including a positive electrode and a negative electrode superimposed upon each other with a separator interposed therebetween. The negative electrode is superimposed upon the positive electrode in a state where a negative electrode active material layer, except the part on a proximal end part of a negative electrode tab, is positioned inside an outer edge of a positive electrode active material layer of the positive electrode. A width H1 of the negative electrode active material layer including the part on the proximal end part of the negative electrode tab, width H2 of the negative electrode active material layer or negative electrode current collector at a part other than the negative electrode tab, and width H3 of the positive electrode active material layer are formed to satisfy the relationships of $H2<H3$, and $(H1-H2) \geq (H3-H2) \div 2$.

19 Claims, 6 Drawing Sheets

(56) References Cited

U.S. PATENT DOCUMENTS

| | | |
|---|---|---|
| 2002/0102205 A1 | 8/2002 | Amatucci |
| 2005/0069777 A1* | 3/2005 | Takami et al. ............... 429/245 |
| 2006/0240323 A1 | 10/2006 | Tomihara et al. |

FOREIGN PATENT DOCUMENTS

| | | | |
|---|---|---|---|
| JP | 10275610 A | * | 10/1998 |
| JP | 11-16577 | | 1/1999 |
| JP | 11-219694 | | 8/1999 |
| JP | 3473397 | | 9/2003 |
| JP | 2005-285429 A | | 10/2005 |
| JP | 2006-139919 | | 6/2006 |
| JP | 2007184219 A | * | 7/2007 |
| JP | 2009-123752 A | | 6/2009 |
| WO | WO 2008/091118 A1 | | 7/2008 |

OTHER PUBLICATIONS

Japanese Office Action issued Feb. 26, 2013 in Patent Application No. 2008-250231 with English Translation.

Office Action issued Feb. 14, 2013 in European Patent Application No. 09171583.9.

Office Action for Japanese Application No. 2008-250231 (issued Nov. 12, 2013) filed on Sep. 29, 2008 with English Translation.

* cited by examiner

NON-AQUEOUS ELECTROLYTE SECONDARY BATTERY, ELECTRODE USED FOR SECONDARY BATTERY, AND METHOD OF MANUFACTURING ELECTRODE

CROSS-REFERENCE TO RELATED APPLICATIONS

This application is a Divisional of U.S. patent application Ser. No. 12/568,103, filed Sep. 28, 2009, now U.S. Pat. No. 8,334,071, issued Dec. 18, 2012, which is based upon and claims the benefit of priority of Japanese Patent Applications No. 2008-250231, filed Sep. 29, 2008; and No. 2008-255198, filed Sep. 30, 2008, the entire contents of all three of which are incorporated herein by reference.

BACKGROUND OF THE INVENTION

1. Field of the Invention

The present invention relates to a non-aqueous electrolyte secondary battery, an electrode used for the secondary battery, and a method of manufacturing the electrode.

2. Description of the Related Art

In recent years, a non-aqueous electrolyte secondary battery has attracted attention as a power source of a hybrid electric vehicle or electric storage device for an electric generator using green energy such as solar energy and wind power. In such uses, the temporal variation in the load or generated power is dramatic, and hence a secondary battery with high capability for instantly storing or releasing a large current, i.e., a secondary battery with a exceptional high-current characteristics is demanded.

In general, a non-aqueous electrolyte secondary battery is provided with an exterior member or a container, formed of a metal, a laminate film or the like, an electrode body contained in the container together with an electrolyte liquid, and electrode terminals connected to the electrode body and exposed to the outside.

The electrode body is configured by superimposing a negative electrode plate obtained by forming a negative electrode active material layer on a current collector plate and a positive electrode plate obtained by forming a positive electrode active material layer on a current collecting plate upon each other with a separator interposed between the electrodes, and rolling up or stacking the resultant. Further, tabs for current collection extend from a side edge of the current collector plate (for example, Jpn. Pat. Appln. KOKAI. Publication No. 2006-139919).

In such a secondary battery with a high degree of high-current characteristics as described above, in order to make the reduction of the voltage as small as possible when a large current is made to flow, it is necessary to make the resistance of the active material layer small. However, at this time, the following problems are caused.

One of them is a problem due to the reduction in the resistance of the active material layer. It is the fact that in the electrode body constituted of a positive electrode, negative electrode, and separator for electrically separating these electrodes from each other, when the positive electrode and negative electrode are short-circuited by a minute conductive foreign substance through the separator for some reason, a minute leakage current flowing there becomes relatively larger by an amount corresponding to the reduction in the resistance of the active material layer. As a result of this, current leakage occurs even when the battery is not used, and the battery capacity is rapidly decreased from the normal level.

The second is a problem of electrode strain occurring in a coil-shaped electrode body formed by rolling up the electrodes into a cylinder or flat shape, when the electrode body is subjected to an electrode rolling/pressing process to reduce the resistance thereof. The electrode body formed by rolling up the electrodes into a cylindrical or flat shape is provided with a large number of current collection tabs. By increasing the number of tabs, it is possible to increase the cross-sectional area of the tabs through which the current flows and, consequently, the resistance decreases. However, in the electrode rolling/pressing process, pressure is applied to the active material layer, whereas no pressure is applied to the tabs since the roll of the rolling press is not brought into contact with the tabs. As a result of this, strain is caused at the boundary between the active material layer to which pressure is applied, and the tabs to which no pressure is applied. When such a strained electrode is rolled up, a gap is formed between the electrodes of the rolled-up coil, and the resistance component is increased.

As methods of forming an electrode with current collection tabs, there are provided a method of welding tabs to that parts of a current collector constituted of metallic foil, which are coated with the active material layer, and a method of punching uncoated parts of a current collector constituted of metallic foil to thereby forming tabs integral with the current collector. The number of tabs can be easily increased in the latter method, and hence the latter method is advantageous to a lithium ion secondary battery for the large current use.

The latter method is disclosed in, for example, Jpn. Pat. Appln. KOKAI Publication No. 2006-139919. According to this method of manufacturing a battery electrode, a width of an uncoated part (part on which no active material layer is arranged) continuously formed at a side edge part on the surface of a current collector in the longitudinal direction of the electrode is made 1 to 10 mm, a large number of tabs are formed in the uncoated part of the current collector by extending the current collector at predetermined intervals and, thereafter the active material layer is pressed in the thickness direction.

However, in such a manufacturing method and electrode, a part on which no active material layer is arranged is located between the tab and the active material layer, and hence there is a problem to be solved in the capacity per unit volume. Further, the mechanical strength of the tab is low, and hence a case is conceivable where the tab is deformed or strained in the manufacturing process.

BRIEF SUMMARY OF THE INVENTION

The present invention has been contrived in consideration of these circumstances, and an object thereof is to provide a non-aqueous electrolyte secondary battery capable of preventing the capacity from being reduced by a minute internal short circuit. Another object of the present invention is to provide a battery electrode and a method of manufacturing the battery electrode, capable of reducing defects due to bending of tabs.

According to an aspect of the invention, there is provided a non-aqueous electrolyte secondary battery comprising: an exterior member; and an electrode body and non-aqueous electrolyte liquid contained in the exterior member, the electrode body including a positive electrode and a negative electrode superimposed upon each other with a separator interposed between the electrodes, the positive electrode including a positive electrode current collector having an outer edge, a positive electrode tab protruding from the outer edge of the positive electrode current collector and being continued with the positive electrode current collector without a joint, and a positive electrode active material layer formed on the positive electrode current collector over the entire width of the positive electrode current collector, the negative electrode including a negative electrode current collector having an outer edge, a negative electrode tab protruding from the outer edge of the negative current collector and being continued with the negative electrode current collector without a joint, and a negative electrode active material layer containing lithium titanate, formed on the negative electrode current collector over the entire width of the negative electrode current collector, and on a proximal end part of the negative electrode tab, the negative electrode being superimposed upon the positive electrode in a state where the negative electrode active material layer, except the part on the proximal end part of the negative electrode tab, is positioned inside an outer edge of the positive electrode active material layer, and a width H1 of the negative electrode active material layer including the part thereof formed on the proximal end part of the negative electrode tab, width H2 of the negative electrode active material layer or negative electrode current collector at a part other than the negative electrode tab, and width H3 of the positive electrode current collector or positive electrode active material layer being formed to satisfy the relationships of $$H2 < H3, \text{ and } (H1 - H2) \geq (H3 - H2) \div 2.$$

According to another aspect of the invention, there is provided a battery electrode comprising: a current collector made of metallic foil; a tab made of metallic foil, and protruding from the current collector; and an active material-containing layer formed on each of both surfaces of the current collector, and an area including a proximal end part of the tab on the current collector side.

According to still another aspect of the invention, there is provided a method of manufacturing a battery electrode including a current collector made of metallic foil, a tab made of metallic foil and protruding from the current collector, and an active material-containing layer formed on each of both surfaces of the current collector, and an area including a proximal end part of the tab on the current collector side, the method comprising: forming an active material-containing layer on each of both surfaces of metallic foil except one end part at which the tab is to be formed; cutting out the metallic foil on which the active material-containing layers are formed to form a current collector on both surfaces of which the active material-containing layers are formed, and a tab in which the active material-containing layer is formed on the area; and pressing the active material-containing layer in a thickness direction thereof.

According to an aspect of the present invention, it is possible to obtain a non-aqueous electrolyte secondary battery capable of preventing the capacity from being reduced by a minute short circuit, and outputting high power. According to an embodiment of the present invention, it is possible to provide a battery electrode and manufacturing method thereof capable of reducing defects due to bending of tabs.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
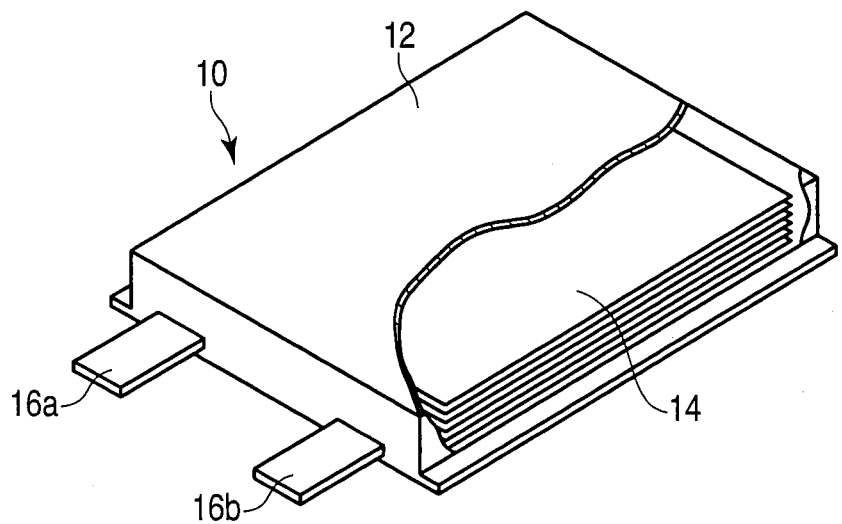
FIG. 1 is a perspective view showing a non-aqueous electrolyte secondary battery, according to an embodiment of the present invention, in a partially cutaway state.
Figure 2:
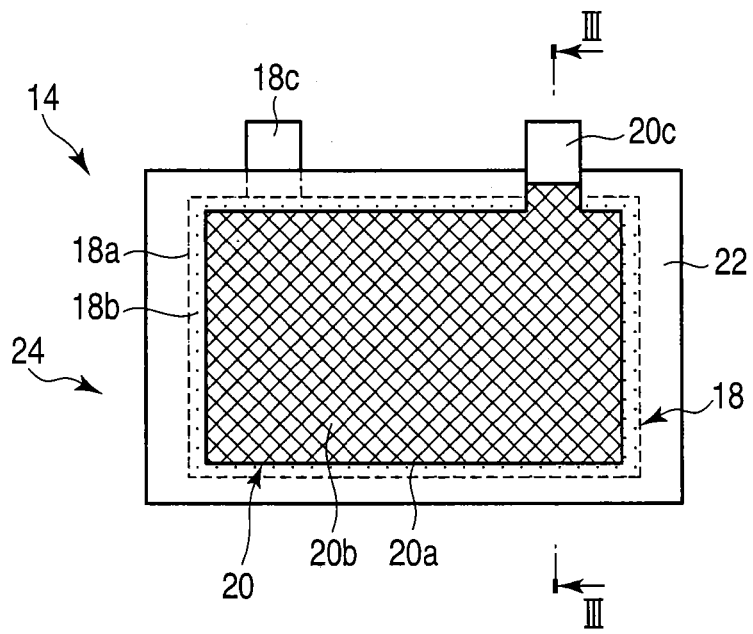
FIG. 2 is a side view showing an electrode body of the non-aqueous electrolyte secondary battery.
Figure 3:
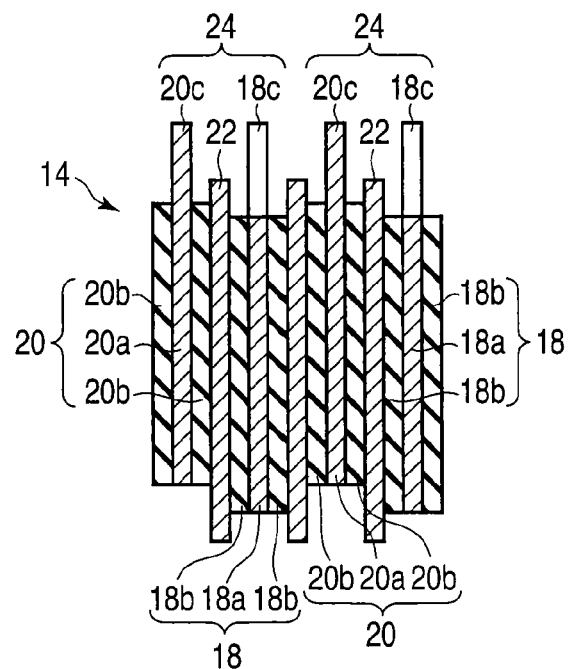
FIG. 3 is a cross-sectional view of the electrode body taken along line III-III of FIG. 2.
Figure 4A:
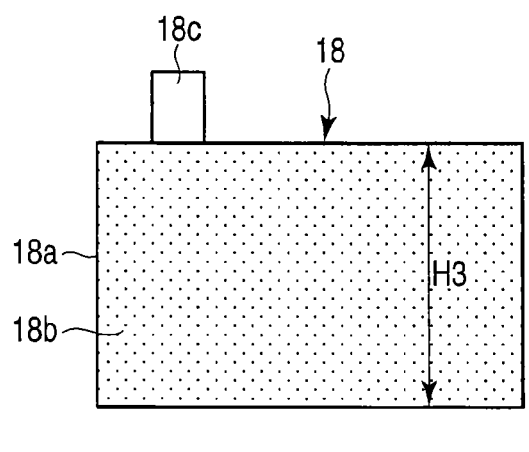
FIGS. 4A and 4B are side views respectively showing a positive electrode and negative electrode of the electrode body.
Figure 4B:
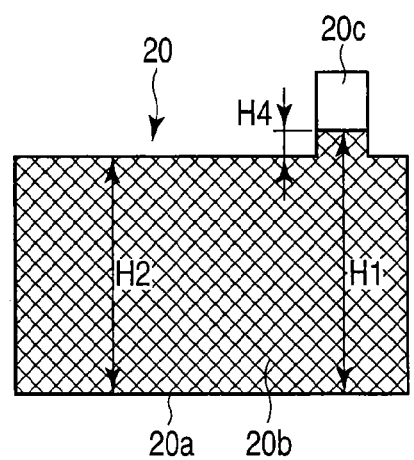

A non-aqueous electrolyte secondary battery according to an embodiment of the present invention will be described below in detail. FIG. 1 is a perspective view showing an external appearance of the non-aqueous electrolyte secondary battery according to the embodiment, FIG. 2 is a plan view showing part of an electrode body in the non-aqueous electrolyte secondary battery, FIG. 3 is a cross-sectional view showing the electrode body by cutting the electrode body along line III-III of FIG. 2, and FIGS. 4A and 4B are plan views respectively showing a positive electrode and negative electrode. It should be noted that each drawing is a schematic view of the embodiment for promoting comprehension thereof, and there are parts different from the actual secondary battery in shape, dimension, ratio, and the like. However, these parts can be appropriately changed in design in consideration of the following description and heretofore known art.

As shown in FIG. 1, a non-aqueous electrolyte secondary battery is configured as a thin-type secondary battery 10 such as a lithium-ion battery or the like. The secondary battery 10 includes, as a exterior container, an exterior member 12 having a flat rectangular box-shape, formed of, for example, a laminated film, in which a laminated electrode body 14 is contained together with a non-aqueous electrolyte liquid. A positive electrode terminal 16a, and negative electrode terminal 16b outwardly protrude from an end surface of the exterior member 12. The positive electrode terminal 16a and negative electrode terminal 16b are respectively connected to the positive electrode and negative electrode constituting the electrode body 14.

As shown in FIGS. 2, 3, 4A, and 4B, the electrode body 14 is configured by stacking a plurality of electrode cells 24 with separators 22 interposed between the cells 24. Each of the electrode cells 24 is formed by laying a positive electrode 18 and a negative electrode 20 one on top of each other with a separator 22 interposed therebetween.

Each of the positive electrodes 18 includes a rectangular positive electrode current collector 18a formed of a foil of aluminum or the like, and a positive electrode active material layers 18b formed on both surfaces of the positive electrode current collector 18a. The positive electrode active material layer 18b is formed on the overall surface of the positive electrode current collector 18a. Each positive electrode 18 includes a positive electrode tab 18c for current collection protruding at substantially right angles from an outer edge, for example, a side edge of the positive electrode current collector 18a. The positive electrode tab 18c is formed of the same material as the positive electrode current collector 18a integral with the positive electrode current collector 18a, and continuously extends from the positive electrode current collector 18a without a break or joint such a welding. The positive electrode current collector 18a and positive electrode active material layer 18b are formed into a size with a width H3 of, for example, 52 mm.

Each of the negative electrodes 20 includes a rectangular negative electrode current collector 20a constituted of foil of aluminum or the like, and negative electrode active material layers 20b formed on both surfaces of the negative electrode current collector 20a. The negative electrode active material layer 20b is formed on the overall surface of the negative electrode current collector 20a. Each negative electrode 20 includes a negative electrode tab 20c for current collection protruding at substantially right angles from an outer edge, for example, a side edge of the negative electrode current collector 20a. The negative electrode tab 20c is formed of the same material as the negative electrode current collector 20a integral with the negative electrode current collector 20a, and continuously extends from the negative electrode current collector without a break or joint such as a welding. The negative electrode tab 20c protrudes to the same side as the positive electrode tab 18c, and is provided on the opposite side of the positive electrode tab 18c with respect to the longitudinal direction of the negative electrode current collector 20a.

The negative electrode active material layers 20b are continuously formed on both sides of a proximal end part of the negative electrode tab 20c. A width of the negative electrode current collector 20a, and a width of the negative electrode active material layer 20b at a part other than the negative electrode tab 20c are formed into, for example, a width H2 of 50 mm. A width of the negative electrode active material layer 20b including the layer 20b formed at the proximal end part of the negative electrode tab 20c is formed into, for example, a width H1 of 53 mm. As a result of this, a width H4 of the negative electrode active material layer 20b is formed in a size of 1 mm or larger, and 3 mm in this case.

As described above, the width H1 of the negative electrode active material layer 20b including the layer 20b formed at the proximal end part of the negative electrode tab 20c, width H2 of the negative electrode current collector 20a or negative electrode active material layer 20b at a part other than the negative electrode tab 20c, and width H3 of the positive electrode current collector 18a or positive electrode active material layer 18b are formed to satisfy the following relationships.

$$H2 < H3, \text{ and } (H1-H2) \geq (H3-H2) \div 2$$

Further, a length of the positive electrode current collector 18a and positive electrode active material layer 18b is longer than a length of the negative electrode current collector 20a and negative electrode active material layer 20b.

Each of the positive electrode 18, and negative electrode 20 is rolled by applying a load thereto by means of a roll press. Further, by selecting the load of the roll press, the electrode is formed in such a manner that, after the rolling, a ratio W2/W1 of the weight W2 of the electrode current collector per unit area thereof to the weight W1 of the electrode tab part per unit area thereof satisfies the relationship of $0.995 < W2/W1 < 0.999$.

As shown in FIGS. 2 and 3, in each electrode cell 24, the positive electrode 18 and negative electrode 20 are laid one on top of each other with the separator 22 interposed between the electrodes. At this time, the negative electrode 20 is arranged in such a manner that an outer edge thereof is opposed to the inner side of an outer edge of the positive electrode active material layer 18b of the positive electrode 18 except for the negative electrode tab 20c. The negative electrode active material layer 20b supported on the proximal end part of the negative electrode tab 20c extends to at least a position opposed to the outer edge of the positive electrode active material layer, and desirably extends to the outside beyond the position opposed to the outer edge of the positive electrode active material layer 18b. As a result of this, at a part at which the positive electrode 18 and negative electrode 20 are opposed to each other, the positive electrode active material layer 18b and negative electrode active material layer 20b are always opposed to each other, and no part at which the metallic parts of the electrode current collector and current collection tab are opposed to each other exists.

It should be noted that the separator 22 is formed larger than the positive electrode 20, and is formed in such a manner that an outer circumference thereof is within a range outside the positive electrode 20, and not exceeding the positive electrode tab 18c and negative electrode tab 20c.

The positive electrode tab 18c and negative electrode tab 20c of each electrode cell 24 of the electrode body 14 formed in the manner described above are respectively connected to the positive electrode terminal 16a and negative electrode terminal 16c.

Next, each constituent element of the secondary battery 10 will be described below in detail.

(Positive Electrode Slurry and Positive Electrode)

The positive electrode active material layer 18b is formed by coating of positive electrode slurry. The positive electrode slurry is formed by mixing a positive electrode active material, positive electrode conductive agent, and binding agent with each other. As the positive electrode active material to be contained in the positive electrode slurry, a general lithium transition metal compound oxide can be used. Examples of the above transition metal compound oxide include $LiCoO_2$, $LiNi_{1-x}Co_xO_2$ ($0<x<0.3$), $LiMn_xNiyCo_zO_2$ ($0<x<0.5$, $0<y<0.5$, $0 \leq z<0.5$), $LiMn_{2-x}M_xO_4$ (M is Li, Mg, Co, Al, Ni, $0<x<0.2$), $LiMPO_4$ (M is Fe, Co, Ni), and the like.

Examples of the positive electrode conductive agent for enhancing the current collection performance, and reducing the contact resistance associated with the contact with the current collector include carbonaceous matter such as acetylene black, carbon black, graphite, and the like.

Examples of the binding agent for binding the positive electrode active material and positive electrode conductive agent to each other include polytetrafluoroethylene (PTFE), polyvinylidene-fluoride (PVdF), fluorine-containing rubber, and the like.

As for the compounding ratio of the positive electrode active material, positive electrode conductive agent, and binding agent, it is desirable that the positive electrode active material be 80% by weight or more, and 95% by weight or less, positive electrode conductive agent be 3% by weight or more, and 18% by weight or less, and binding agent be 2% by weight or more, and 17% by weight or less. As for the positive electrode conductive agent, by being 3% by weight or more, it is possible for the positive electrode conductive agent to exhibit the above-mentioned effect, and by being 18% by weight or less, it is possible for the agent to reduce decomposition of the non-aqueous electrolyte on the surface of the positive electrode conductive agent in high-temperature storage. As for the binding agent, by being 2% by weight or more, it is possible for the binding agent to obtain sufficient electrode strength, and by being 17% by weight or less, it is possible for the agent to reduce the blending quantity of the electrode insulator, and reduce the internal resistance.

The slurry is prepared by suspending the positive electrode active material, conductive agent, and binding agent in an appropriate solvent. An example of the solvent is N-methyl-ethyl-pyrrolidone. It is desirable that the weight ratio of the gross weight of the positive electrode active material, conductive agent, and binding agent to the weight of the solvent be 50:50 to 80:20.

It is desirable that the positive electrode current collector $18a$ serving also as a backing to be coated with the slurry be constituted of aluminum foil or foil of an aluminum alloy containing an element such as Mg, Ti, Zn, Mn, Fe, Cu, Si, or the like.

The positive electrode is prepared by suspending, for example, the positive electrode active material, positive electrode conductive agent, and binding agent in an appropriate solvent, coating the positive electrode current collector with the slurry prepared as the suspended matter, drying the resultant to manufacture a positive electrode layer, and thereafter subjecting the positive electrode layer to pressing work.

(Negative Electrode Slurry and Negative Electrode)

The negative electrode active material layer $20b$ is formed by coating of negative electrode slurry. The negative electrode slurry is formed by mixing a negative electrode active material, negative electrode conductive agent, and binding agent with each other. As the negative electrode active material to be contained in the negative electrode slurry, for example, a metallic compound oxide containing titanium can be used, and examples thereof include a lithium-titanium oxide, titanium-based oxide containing no lithium at the time of the oxide synthesis, and the like.

Examples of the lithium-titanium oxide include $Li_{4+x}Ti_5O_{12}$ ($0 \leq x \leq 3$) with a spinel structure, and $Li_{2+y}Ti_3O_7$ ($0 \leq y \leq 3$) with a ramsdellite structure.

Examples of the titanium-based oxide include $TiO_2$, and a metallic compound oxide containing Ti, and at least one kind of element selected from a group constituted of P, V, Sn, Cu, Ni, Co, and Fe. As for $TiO_2$, $TiO_2$ of the anatase type, and the heat treatment temperature of which is 300 to 500° C., and which is of low crystallizability is desirable.

Examples of the metallic compound oxide containing Ti, and at least one kind of element selected from a group constituted of P, V, Sn, Cu, Ni, Co, and Fe include $TiO_2$—$P_2O_5$, $TiO_2$—$V_2O_5$, $TiO_2$—$P_2O_5$—$SnO_2$, $TiO_2$—$P_2O_5$-MeO (Me is at least one kind of element selected from a group constituted of Cu, Ni, Co, and Fe), and the like. It is desirable that this metallic compound oxide be of a micro-structure, in which the crystalline phase and amorphous phase coexist, or the amorphous phase exists alone. By employing a metallic compound oxide being of such a micro-structure, it is possible to largely improve the cycle performance. Above all, a metallic compound oxide containing a lithium-titanium oxide, Ti, and at least one kind of element selected from a group constituted of P, V, Sn, Cu, Ni, Co, and Fe is desirable.

Examples of the negative electrode conductive agent include acetylene black, carbon black, graphite, and the like.

Examples of the binding agent for binding the negative electrode active material and negative electrode conductive agent to each other include polytetrafluoroethylene (PTFE), polyvinylidene-fluoride (PVdF), fluorine-containing rubber, styrene-butadiene rubber, and the like.

As for the compounding ratio of the negative electrode active material, negative electrode conductive agent, and binding agent, it is desirable that the negative electrode active material be 70% by weight or more, and 96% by weight or less, negative electrode conductive agent be 2% by weight or more, and 28% by weight or less, and binding agent be 2% by weight or more, and 28% by weight or less. When the negative electrode conductive agent is less than 2% by weight, the current collection performance of the negative electrode layer decreases, and the high-current characteristic of the non-aqueous electrolyte secondary battery decreases. Further, when the binding agent is less than 2% by weight, the binding property of binding the negative electrode layer and negative electrode current collector with each other decreases, and the cycle characteristic decreases. On the other side, from the viewpoint of the tendency toward higher capacity, it is desirable that each of the negative electrode conductive agent and binding agent be 28% by weight or less.

The negative electrode slurry is prepared by suspending the negative electrode active material, conductive agent, and binding agent in an appropriate solvent. An example of the solvent is N-methyl-ethyl-pyrrolidone. It is desirable that the weight ratio of the gross weight of the negative electrode active material, conductive agent, and binding agent to the weight of the solvent be 50:50 to 80:20.

It is desirable that the negative electrode current collector $20a$ serving also as a backing to be coated with the negative electrode slurry be constituted of aluminum foil or aluminum alloy foil containing an element such as Mg, Ti, Zn, Mn, Fe, Cu, Si, and the like, the aluminum foil and aluminum alloy foil being electrochemically stable in a potential range nobler than 1 V.

The negative electrode 20 is manufactured by coating the negative electrode current collector with the slurry prepared by suspending, for example, the negative electrode active material, negative electrode conductive agent, and binding agent in a generally used solvent, drying the resultant to manufacture a negative electrode layer, and thereafter subjecting the negative electrode layer to pressing work.

(Non-Aqueous Electrolyte)

Examples of the non-aqueous electrolyte include a liquid non-aqueous electrolyte prepared by dissolving an electrolyte in an organic solvent, gel non-aqueous electrolyte obtained by compounding a liquid electrolyte and polymeric material, and the like.

The liquid non-aqueous electrolyte is prepared by dissolving an electrolyte in an organic solvent in a concentration of 0.5 mol/l or more, and 2.5 mol/l or less.

Examples of the electrolyte include lithium salt such as lithium perchlorate ($LiClO_4$), lithium hexafluorophosphate ($LiPF_6$), lithium tetrafluoroborate ($LiBF_4$), arsenic lithium hexafluoride ($LiAsF_6$), lithium trifluoromethanesulfonate ($LiCF_3SO_3$), lithium bistrifluoromethylsulfonylimide [$LiN(CF_3SO_2)_2$], and the like, or mixtures of these. It is desirable that the electrolyte be hardly oxidized at high potential, and $LiPF_6$ is the most desirable.

Examples of the organic solvent include a cyclic carbonate such as propylene carbonate (PC), ethylene carbonate (EC), vinylene carbonate, and the like, chain carbonate such as diethyl carbonate (DEC), dimethyl carbonate (DMC), methyl ethyl carbonate (MEC), and the like, cyclic ether such as tetrahydrofuran (THF), 2-methyltetrahydrofuran (2MeTHF), dioxolane (DOX), and the like, chain ether such as dimethoxyethane (DME), diethoethane (DEE), and the like, and single or mixed solvent such as γ-buthyrolactone (GBL), acetonitrile (AN), sulfolane (SL), and the like.

Examples of the polymeric material include polyvinylidene-fluoride (PVdF), polyacrylonitrile (PAN), polyethylene oxide (PEO), and the like.

It should be noted that as the non-aqueous electrolyte, an ambient temperature molten salt containing lithium ions (ionic melt), polymeric solid electrolyte, inorganic solid electrolyte, and the like may be used.

The ambient temperature molten salt (ionic melt) implies a compound that can exist as a liquid at an ambient temperature (15° C. to 25° C.) among organic salt each constituted of a combination of organic matter cations and anions. Examples of the ambient temperature molten salt include ambient temperature molten salt existing as a liquid in a simple substance, ambient temperature molten salt that becomes a liquid by being mixed with an electrolyte, and ambient temperature molten salt that becomes a liquid by being dissolved in an organic solvent, and the like. It should be noted that in general, a melting point of an ambient temperature molten salt used for a non-aqueous electrolyte battery is 25° C. or lower. Further, in general, an organic matter cation includes a quaternary ammonium skeleton.

The polymeric solid electrolyte is prepared by dissolving an electrolyte in a polymeric material, and solidifying the resultant. The inorganic solid electrolyte is solid matter provided with lithium ion conductivity.

(Separator)

Examples of the material for the separator 22 include a porous film including polyethylene, polypropylene, cellulose or polyvinylidene-fluoride (PVdF), nonwoven fabric made of synthetic resin, and the like. Above all, a porous film constituted of polyethylene or polypropylene can melt at a fixed temperature to break the current, and hence is desirable from a viewpoint of improvement in safety.

(Exterior Member of Battery)

Examples of the exterior member include a laminated film with a thickness of 0.2 mm or less, and metallic container with a thickness of 0.5 mm or less. A metallic container with a thickness of 0.3 mm or less is more desirable.

Examples of the shape include a flat type, rectangular type, cylindrical type, coin type, button type, sheet type, lamination type, and the like. It should be noted that the battery may naturally be a large battery mounted on a two- or four-wheeled vehicle, or the like in addition to a small battery incorporated in a portable electronic device or the like.

The laminated film is a multilayer film constituted of metallic layers and resin layers covering the metallic layers. It is desirable, for the sake of weight reduction, that the metallic layer be aluminum foil or aluminum alloy foil. The resin layer is used to reinforce the metallic layer, and a polymeric material such as polypropylene (PP), polyethylene (PE), nylon, polyethylene terephthalate (PET), and the like can be used for the layer. The laminated film is formed by carrying out sealing by means of thermal fusion bonding.

Examples of the metallic container include containers made of aluminum or aluminum alloy. As the aluminum alloy, an alloy containing an element such as magnesium, zinc, silicon, and the like is desirable. On the other hand, it is desirable that the content of a transition metal such as iron, copper, nickel, chrome, and the like be 1% or less. As a result of this, it becomes possible to remarkably improve the long-term reliability in the high-temperature environment, and heat-radiation property.

According to the secondary battery 10 configured in the manner described above, the width H1 of the negative electrode active material layer 20b including the layer 20b formed at the proximal end part of the negative electrode tab 20c, width H2 of the negative electrode current collector 20a or negative electrode active material layer 20b at a part other than the negative electrode tab 20c, and width H3 of the positive electrode current collector 18a or positive electrode active material layer 18b are formed to satisfy the relationships of $H2<H3$, and $(H1-H2) \geq (H3-H2) \div 2$. In each electrode cell 24, the negative electrode 20 is arranged in such a manner that an outer circumference thereof is opposed to the inner side of the outer circumference of the positive electrode active material layer 18b of the positive electrode 18 except for the negative electrode tab 20c. The negative electrode active material layer 20b supported on the proximal end part of the negative electrode tab 20c is formed to extend to the outside beyond the position opposed to the circumferential edge of the positive electrode active material layer 18b. As a result of this, at a part at which the positive electrode 18 and negative electrode 20 are opposed to each other, the positive electrode active material layer 18b and negative electrode active material layer 20b are always opposed to each other, and no part at which the metallic parts of the electrode current collector and current collection tab are opposed to each other exists.

Accordingly, even when the positive electrode and negative electrode are short-circuited by a minute conductive foreign substance through the separator for some reason, it is possible to prevent the capacity of the secondary battery from being reduced by the minute short circuit.

Further, each of the electrodes of the secondary battery is formed in such a manner that, after the rolling, a ratio W2/W1 of the weight W2 of the electrode current collector per unit area thereof to the weight W1 of the electrode tab part per unit area thereof satisfies the relationship of $0.995<W2/W1$. As a result of this, it is possible to prevent strain from being caused at the boundary between the current collector and tab, and arrange the electrodes by lamination without causing a gap between the electrodes. Accordingly, it is possible to obtain a non-aqueous electrolyte secondary battery in which an resistance component resulting from the gap between the electrodes is reduced, and which outputs high power.

On the other hand, when the ratio W2/W1 becomes 0.999 or more, the load at the time of the rolling is insufficient, and the physical contact between the electrode active material layer and current collector becomes insufficient. As a result of this, the contact resistance between the electrode active material layer and current collector is increased, and hence the output is conversely reduced. Accordingly, it is more desirable that the ratio W2/W1 should satisfy the relationship of $0.995<W2/W1<0.999$.

In order to confirm the function/effect of the secondary battery, electrode bodies of secondary batteries according to following examples 1, and comparative examples 1 and 2 were formed, and the characteristics were compared with each other.

Example 1

Figure 5:
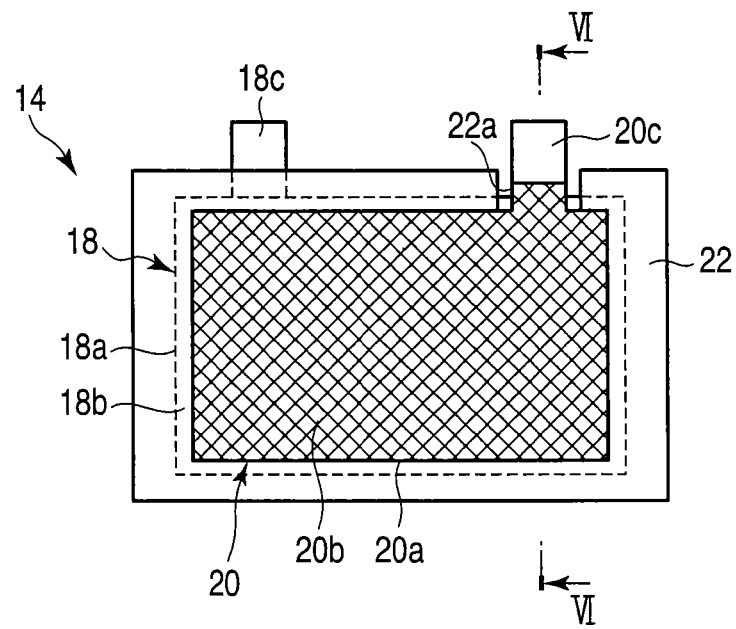
FIG. 5 is a side view showing an electrode body of a non-aqueous electrolyte secondary battery according to example 1.

An electrode current collector constituted of aluminum foil was coated with lithium cobaltate as the positive electrode active material, and an electrode current collector was coated with lithium titanate as the negative electrode active material, whereby a positive electrode 18 and negative electrode 20 were formed. A positive electrode 18 and negative electrode 20 were cut out into the electrode-shape as shown in FIG. 5. At this time, a width H1 of the negative electrode active material layer 20b including the part thereof formed at the proximal end part of the negative electrode tab 20c, width H2 of the negative electrode current collector 20a, or the negative electrode active material layer 20b at the part other than the negative electrode tab 20c, and width H3 of the positive electrode current collector 18a, or positive electrode active material layer 18b were respectively set as H1=53 mm, H2=50 mm, and H3=52 mm.

Figure 6:
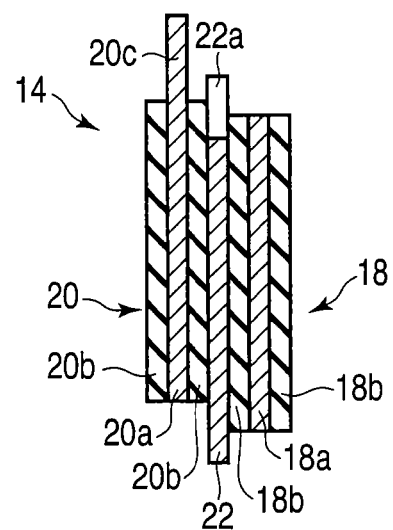
FIG. 6 is a cross-sectional view of the electrode body taken along line VI-VI of FIG. 5.

As shown in FIGS. 5 and 6, the negative electrodes 20 and positive electrodes 18 were stacked one on top of the other with the separators 22 interposed between the electrodes. At this time, a notch 22a was formed at a part of the separator 22 at which the negative electrode tab 20c and positive electrode 18 were opposed to each other, and the lamination was configured so that the positive electrode 18 and negative electrode tab 20c can be in direct contact with each other. This is a simulation of causing the positive electrode 18 and negative electrode 20 to be short-circuited by a minute conductive foreign substance penetrating the separator 22. When force is applied to the electrodes from both sides, the electrodes are brought into contact with each other through the notch 22a of the separator 22, and when the force is not applied, the electrodes are not brought into contact with each other.

The positive electrodes 18 and negative electrodes 20 stacked in the manner described above were soaked with an electrolytic solution, and were thereafter sealed in an exterior member constituted of a laminate film to prepare a secondary battery. After charging the secondary battery, force was applied to the electrode body at the notch 22a of the separator 22 to cause a minute short circuit, the battery was kept in this state for seven days, and thereafter the remaining charge of the secondary battery was measured. As a result of this, charge of about 95% of the capacity was left. The measurement result is shown in following Table 1.

Example 2

Positive electrodes and negative electrodes identical with example 1 were manufactured except for that the widths H1, H2, and H3 were set as H1=51 mm, H2=50 mm, and H3=52 mm.

A battery identical with example 1 was manufactured by using the above positive electrodes and negative electrodes, and the identical measurement was carried out. The result is shown in Table 1.

Example 3

Positive electrodes and negative electrodes identical with example 1 were manufactured except for that the widths H1, H2, and H3 were set as H1=103 mm, H2=100 mm, and H3=102 mm.

A battery identical with example 1 was manufactured by using the above positive electrodes and negative electrodes, and the identical measurement was carried out. The result is shown in Table 1.

Comparative Example 1

Figure 7:
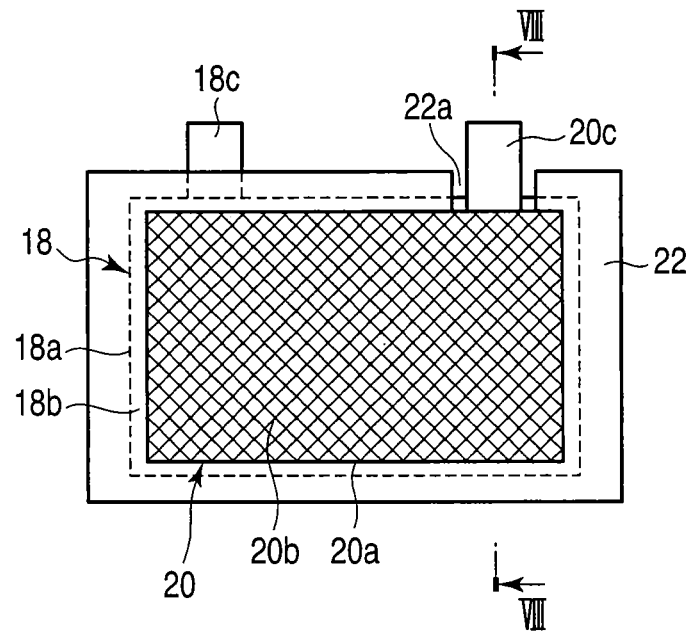
FIG. 7 is a side view showing an electrode body of a non-aqueous electrolyte secondary battery according to comparative example 1.
Figure 8:
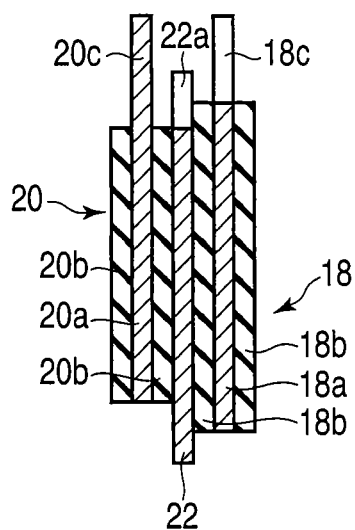
FIG. 8 is a cross-sectional view of the electrode body taken along line VIII-VIII of FIG. 7.

As shown in FIGS. 7 and 8, an electrode was manufactured without coating a negative electrode tab 20c of a negative electrode 20 with a negative electrode active material layer 20b. The other configurations are identical with example 1. That is, a width H1 of the negative electrode active material layer 20b at a position of the negative electrode tab 20c, width H2 of the negative electrode active material layer 20b at a position other than the negative electrode tab 20c, and width H3 of the positive electrode current collector 18a or positive electrode active material layer 18b were respectively set as H1=H2=50 mm, and H3=52 mm. The structure of comparative example 1 is a structure in which the aluminum foil constituting the negative electrode tab 20c is opposed to the positive electrode active material layer 18b.

The positive electrodes 18 and negative electrodes 20 were stacked one on top of the other with the separators 22 interposed between the electrodes. At this time, a notch 22a was formed at a part of the separator 22 at which the negative electrode tab 20c and positive electrode 18 were opposed to each other, and the lamination was configured so that the positive electrode 18 and negative electrode tab 20c can be in direct contact with each other. This is a simulation of causing the positive electrode 18 and negative electrode 20 to be short-circuited by a minute conductive foreign substance penetrating the separator 22. When force is applied to the electrodes from both sides, the electrodes are brought into contact with each other through the notch 22a of the separator 22, and when the force is not applied, the electrodes are not brought into contact with each other.

The positive electrodes 18 and negative electrodes 20 stacked in the manner described above were soaked with an electrolytic solution, and were thereafter sealed in an exterior member constituted of a laminate film to prepare a secondary battery. After charging the secondary battery, force was applied to the electrode body at the notch 22a of the separator 22 to cause a minute short circuit, the battery was kept in this state for seven days, and thereafter the remaining charge of the secondary battery was measured. As a result of this, charge of about 60% of the capacity was left. The result is shown in following Table 1.

Comparative Example 2

A negative electrode active material layer 20b was formed not by using lithium titanate as the negative electrode active material layer, but by using carbon. The other configurations are identical with example 1. After charging the secondary battery, force was applied to the electrode body at the notch 22a of the separator 22 to cause a minute short circuit, the battery was kept in this state for seven days, and thereafter the remaining charge of the secondary battery was measured. As a result of this, charge of about 61% of the capacity was left. The result is shown in following Table 1.

TABLE 1

| | Negative electrode active material | H1 | H2 | H3 | Remaining capacity ratio after minute short circuit |
|---|---|---|---|---|---|
| Example 1 | Lithium titanate | 53 | 50 | 52 | 95% |
| Example 2 | Lithium titanate | 51 | 50 | 52 | 94% |
| Example 3 | Lithium titanate | 103 | 100 | 102 | 95% |
| Comparative Example 1 | Lithium titanate | 50 | 50 | 52 | 60% |
| Comparative Example 2 | Carbon | 53 | 50 | 52 | 61% |

As can be seen from Table 1, when lithium titanate is used as the active material layer of the negative electrode, and the following relationships are satisfied, it can be seen that reduction of the capacity due to the minute short circuit is small.

$$H2<H3, \text{ and } (H1-H2) \geq (H3-H2) \div 2$$

This is because lithium titanate which is the negative electrode active material becomes an insulator in the discharging state. That is, it is conceivable that this is because even when a minute short-circuit as shown in example 1 occurs, the negative electrode active material layer is brought into the discharging state in the vicinity of the minute short circuit, and the negative electrode active material layer in the discharging state becomes an insulator, whereby no short-circuit current flows through the negative electrode active material layer that has become an insulator.

On the other hand, even when lithium titanate is used as the active material layer of the negative electrode 20 as in the case of comparative example 1, if the relationships shown by the above expressions are not satisfied, it can be seen that reduction of the capacity of the secondary battery is great. It is conceivable that this is because the positive electrode active material layer and the aluminum part of the negative electrode current collector are in contact with each other, the negative electrode 20 does not become an insulator unlike example 1, and hence the current continues to flow.

Further, in comparative example 2, carbon is used as the negative electrode 20, and hence even when a minute short circuit occurs, the resistance of the negative electrode does not change, and remains small. In this case too, it is conceivable that when the minute short circuit occurs, the current continues to flow, and reduction of the capacity is great.

Example 4

A positive electrode 18, and negative electrode 20 were formed by using lithium cobaltate as a positive electrode active material, using lithium titanate as a negative electrode active material, and using aluminum foil as a current collector. Further, electrodes were cut out into the electrode-shapes as shown in FIG. 2. At this time, widths H1, H2, and H3 were set as H1=53 mm, H2=50 mm, and H3=52 mm.

Thereafter, a load was applied to the positive electrode by using a roll press, thereby rolling the positive electrode. Thereafter, the electrode active layers on the front side and back side were peeled off, and the aluminum foil serving as the current collector was exposed. Part of the exposed aluminum foil was cut out, and the weight W2 per unit area was obtained. Then, part of the aluminum foil of the electrode tab part was cut out, and the weight W1 per unit area was obtained. From thus obtained W2 and W1, W2/W1 was calculated. The measurement of W2 and W1 was repeated while changing the load of the roll press until W2/W1 finally becomes 0.008 (i.e., W2/W1=0.998), whereby a positive electrode was manufactured. As for a negative electrode, W2/W1 was also set as 0.998 (i.e., W2/W1=0.998).

As described above, the electrode was rolled so that W2/W1=0.998 can be obtained, whereby it was possible to laminate the electrodes without causing strain at the boundary between the current collector and electrode tab, and without a gap between the electrodes.

The positive electrodes 18 and negative electrodes 20 prepared in the manner described above were soaked with an electrolytic solution, were thereafter laminated through separators interposed between the electrodes, and were sealed in an exterior member constituted of a laminate film to manufacture a secondary battery.

After charging the secondary battery, the resistance R0 was measured. The method of measuring the resistance was as follows. A current at which the assembled battery was completely discharged was set as 1C, and a current ten times as large as 1C was set as 10C. First, the battery was discharged at the current 1C for 0.2 seconds, and the battery voltage V1 after an elapse of 0.2 seconds was measured. Subsequently, the battery was discharged at the current 1C for 0.2 seconds, and the battery voltage V2 after an elapse of 0.2 seconds was measured. Further, the resistance R0 was calculated by the expression of R0=(V1−V2)/(10C−1C). The value of R0 at this time was set as 1. The result is shown in Table 2.

Example 5

A secondary battery identical with example 4 was manufactured except for that in each of a positive electrode and negative electrode, W2/W1=0.997 was set. Further, the resistance R1 of the battery was measured by the same method. The ratio of R1 to the resistance R0 measured in example 4 is shown in Table 2.

Comparative Example 3

A secondary battery identical with example 4 was manufactured except for that in each of a positive electrode and negative electrode, W2/W1=0.995 was set. Further, the resistance R2 of the battery was measured by the same method. The ratio of R2 to the resistance R0 measured in example 4 is shown in Table 2.

Comparative Example 4

A secondary battery identical with example 4 was manufactured except for that in each of a positive electrode and negative electrode, W2/W1=0.999 was set. Further, the resistance R3 of the battery was measured by the same method. The ratio of R3 to the resistance R0 measured in example 4 is shown in Table 2.

TABLE 2

|  | W2/W1 | Ratio of resistance |
|---|---|---|
| Example 4 | 0.998 | 1.00 |
| Example 5 | 0.997 | 1.05 |
| Comparative Example 3 | 0.995 | 1.15 |
| Comparative Example 4 | 0.999 | 1.20 |

As can been seen from Table 2, in comparative example 3, the resistance is larger than example 4. It is conceivable that this is because in example 4, there is no strain at the boundary between the current collector and tab, and the electrodes are in close contact with each other without a gap, while in comparative example 3, strain is caused between the current collector and tab, and a gap is caused between the electrodes.

Further, from Table 2, it can be seen that in comparative example 4, the resistance is larger than example 4. It is conceivable that this is because in comparative example 4, the contact resistance between the active material layer and current collector metal is large, and the resistance is increased.

Next, the electrode to be used in the above-mentioned secondary battery, and manufacturing method thereof will be described below.

The electrode for the secondary battery according to this embodiment is provided with a current collector made of metallic foil, tab made of metallic foil, extended from the current collector, and active material-containing layer formed on each of both surfaces of the current collector, and an area including a proximal end part of the tab. The proximal end part of the tab implies a joint part of the tab positioned on the current collector side, and an end part thereof arranged at the same position as the position of the side edge of the current collector from which the tab of the current collector is extended.

As the electrode group to be used in a non-aqueous electrolyte battery such as the lithium-ion secondary battery, an electrode group formed by rolling up a positive electrode and negative electrode into a flat shape or cylindrical shape with a separator interposed between the electrodes, and electrode group formed by stacking positive electrodes and negative electrodes one on top of each other with separators interposed between the electrodes, and the like are known. In the case of the rolled-up electrode group, when a tab is formed at an uncoated part of a current collector constituted of metallic foil, the tab is also constituted of the metallic foil, and hence handling of the electrodes in the rolling-up step and the like is difficult, and a problem that the tab is bent or the electrode is cut with the tab being a starting point has occurred.

By forming an active material-containing layer at the proximal end part of the tab, it is possible to compensate for the strength of the metallic foil to resist the bending of the tab, and hence it becomes easy to handle the electrode when the electrode group is manufactured. By restricting the width of the tab proximal end part area on which the active material-containing layer is to be formed to 3 mm or less from the proximal end of the tab, it becomes possible to sufficiently enhance the strength of the metallic foil to resist the bending of the tab.

The electrode can be used for each of the rolled-up electrode group and laminated electrode group. When the electrode is used for the rolled-up electrode group, it is desirable that the current collector should have a belt-like shape, and a plurality of tabs be extended from a long side (side parallel with the rolling-up direction) of the current collector. In this case, it is desirable that two sides of the tab opposed to each other be provided with an angle larger than 90° with respect to the long side of the current collector. A tab including such two sides has a rectangular or trapezoidal shape. In this case, a width of the proximal end part of the tab becomes identical with or larger than a width of a distal end thereof, and hence it becomes possible to prevent the electrode from being cut with the proximal end part of the tab being a starting point, and handle the electrode easily when the electrode is treated to manufacture the rolled-up electrode group. Further, by forming the corner part of the joint part of the tab into a rounded shape, it is possible to further improve the strength of the electrode.

The method of manufacturing the battery electrode of the present invention includes a step of forming an active material-containing layer at least on each of both surfaces of metallic foil except one end part at which a lead part is to be formed, a step of obtaining a current collector on both surfaces of which the active material-containing layers are formed, and a lead part in which an active material-containing layer is formed on an area including the lead joint part by cutting out the metallic foil, and a step of pressing the active material-containing layer in the thickness direction.

When both surfaces of the current collector constituted of metallic foil are coated with slurry containing an active material, it is impossible to make the coating positions on both surfaces perfectly coincide with each other in terms of mass production, and not a little deviation is caused. It is sufficient to estimate the deviation to be about 3 mm, this being acceptable to mass production.

However, when there is a deviation from each other in the slurry coating parts on both surfaces of the current collector, there occurs a problem that at a part at which one side only of the current collector is coated with the slurry, pressing is insufficient, and the density is reduced as compared with a part at which both sides of the current collector are coated with slurry. Further, at the part at which one side only of the current collector is coated with slurry, and which is pressed, the density is low, and hence exfoliation of the active material is liable to occur in the process, and there is the possibility of an internal short circuit being caused when exfoliation of the active material occurs, this being a problem in terms of quality.

Furthermore, at a part at which both sides of the current collector are coated with slurry, strong pressing force is applied to the slurry as compared with the part at which one side only of the current collector is coated with slurry, and hence extension occurs in the lateral direction. Accordingly, design is carried out in such a manner that when an electrode on which a slurry-uncoated part is formed is subjected to pressing, the width of the uncoated part is made smaller, or the width of the tab is made smaller to thereby absorb a difference in extension of the electrode between the coated part and uncoated part.

Further, when the electrode is reduced in thickness for large current use, the number of the laminated electrodes or rolled-up length is increased, and hence if an uncoated part of the active material is left on the electrode, there is a problem of disadvantage in terms of capacity.

According to the method of manufacturing an electrode of this embodiment, by cutting out the metallic foil in such a manner that an active material-containing layer is formed on an area including the proximal end part of the tab, a part at which the active material-containing layer is formed on one side only due to the deviation of the coating position is used for the proximal end part of the tab. Accordingly, it is possible to use a part at which the active material-containing layer is formed on each of both surfaces for the electrode main body. As a result of this, it is possible to use only a part in which the coating of the layer is uniform, and the pressing density is also uniform for the electrode, and hence it is possible to reduce unevenness in capacity. Further, an active material-uncoated part of the electrode is eliminated to the utmost, and hence this is advantageous from the viewpoint of capacity density. Furthermore, by excluding a part at which one side only is coated from the electrode main body, it is possible to uniformize the adhesion of the current collector, and suppress electrode exfoliation.

Further, although the pressing of the electrode is carried out after the cutting step of the metallic foil and active material-containing layer, a difference between the extension of the metallic foil of the part at which the active material-coated part is formed on both surfaces due to the pressing, and the extension due to the pressing of the tab is small, and hence it is possible to avoid distortion or bend of the electrode at the time of pressing. When the active material-containing layer is cut out, a burr is caused in some cases. By carrying out pressing after the cutting step, it is possible to smooth the burr.

Embodiments of the present invention will be described below with reference to the accompanying drawings.

First Embodiment

FIGS. 9A, 9B, 10A, and 10B are schematic views showing an electrode to be used in a laminated electrode group, and a manufacturing step thereof.

Figure 9A:
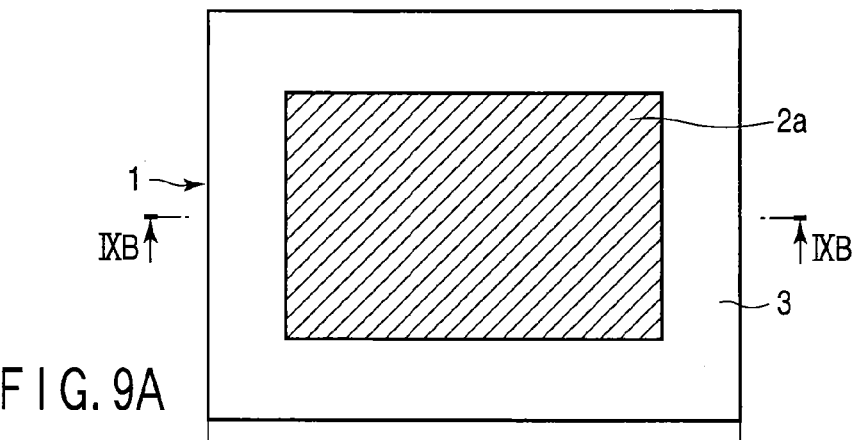
FIG. 9A is a plan view showing a manufacturing step of a battery electrode according to a first embodiment.
Figure 9B:
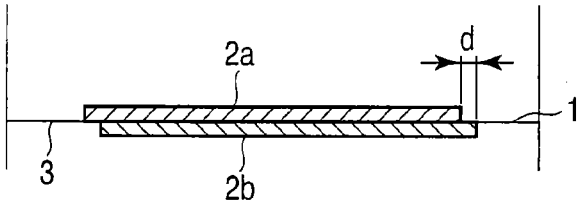
FIG. 9B is a cross-sectional view of the electrode taken along line IXB-IXB of FIG. 9A.

As shown in FIGS. 9A and 9B, both surfaces of rectangular metallic foil excluding the circumferential edge part thereof are coated with slurry containing the active material, are thereafter dried, and are then pressed in the thickness direction of the coated part, whereby active material-coated parts (active material-containing layers) 2a and 2b are formed on both surfaces of the central part of the metallic foil 1. The part at which the metallic foil 1 is exposed, and which surrounds the active material-coated part 2a or 2b is an uncoated part 3.

As shown in FIG. 9B, the coating position of the active material-coated part 2a formed on one surface of the metallic foil 1 is deviated from the coating position of the active material-coated part 2b formed on the opposite surface of the metallic foil 1, and the deviation amount d (distance between the side of the active material-coated part 2a and side of the active material-coated part 2b) is 3 mm or less.

Figure 10A:
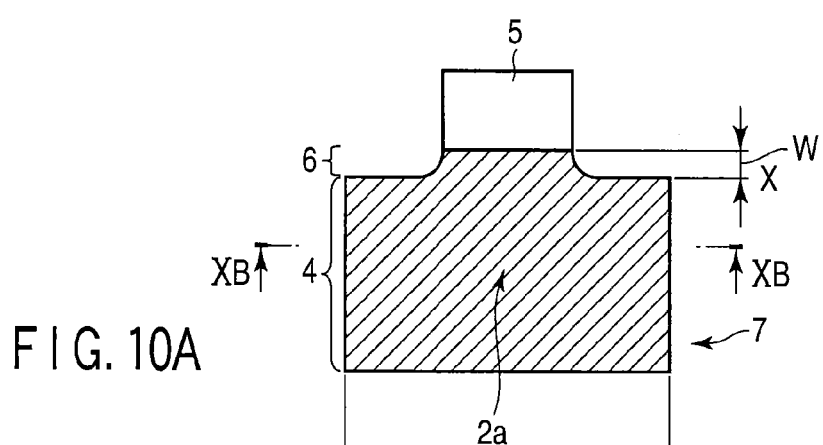
FIG. 10A is a plan view showing a battery electrode according to the embodiment.
Figure 10B:
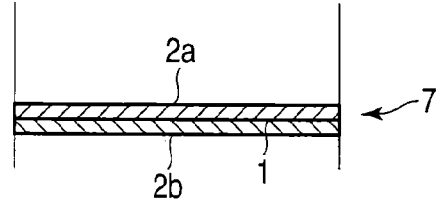
FIG. 10B is a cross-sectional view of the electrode taken along line XB-XB of FIG. 10A.

Subsequently, as shown in FIGS. 10A and 10B, the metallic foil 1 and active material-coated parts 2a and 2b are cut out into a desired shape. That is, an electrode main body 4 (current collector on both surfaces of which active material-containing layers are formed) is punched out from the part on which the active material-coated parts 2a and 2b are formed, and the uncoated part 3, and active material-coated parts 2a and 2b are punched out so that the active material-containing layer can be formed in the area 6 including the proximal end part X of the tab. As a result of this, the part at which the coating positions are deviated from each other can be used for the proximal end part area 6, and hence both surfaces of the side of the electrode main body 4 from which the tab 5 protrudes, and side opposed thereto can be covered with the active material-containing layer. Further, as for the remaining two sides opposed to each other, parts at which the active material-coated part is formed on one surface only are cut off. As a result of this, both surfaces of the electrode main body 4 are covered with the active material-containing layer 2a and 2b as shown in FIG. 10B.

After that, the active material-coated part may be pressed in the thickness direction thereof. This makes it possible to use only the part with uniform coating, and uniform pressing density as the electrode, and reduce unevenness in capacity. Further, an active material-uncoated part of the electrode is eliminated to the utmost, and hence this is advantageous from the viewpoint of capacity density. Furthermore, by cutting off a part at which one side only is coated, the adhesion of the current collector is uniform, and electrode exfoliation can be suppressed.

Further, by carrying out pressing after the tab 5 is punched out from the uncoated part 3, a difference between the extension of the metallic foil of the part at which the active material-coated part is formed on each of both surfaces at the time of the pressing, and the extension of the tab at the time of the pressing becomes small, and hence it is possible to avoid distortion or bend of the electrode at the time of pressing.

When the active material-coated part is cut out, a burr is caused in some cases. By carrying out the pressing after the cutting, it is possible to smooth the burr.

In the electrode 7 manufactured by the above manufacturing method, the active material-containing layers 2a and 2b are formed in the area 6 including the proximal end part X of the tab 5, and hence it is possible to compensate for the strength of the metallic foil 1 to resist the bending of the tab 5. Accordingly, it becomes easy to handle the electrode when the electrode group is manufactured.

Further, by restricting the width W of the area 6 to 3 mm or less from the proximal end of the tab 5, i.e., from the side edge of the electrode main body 4, it becomes possible to sufficiently enhance the strength of the metallic foil to resist the bending of the tab.

Second Embodiment

Figure 11:
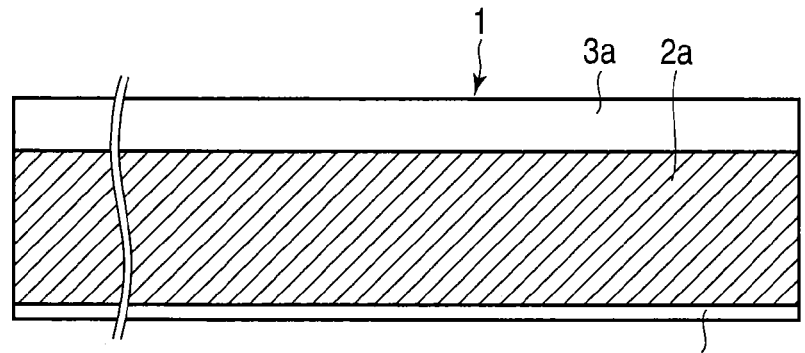
FIG. 11 is a plan view showing a manufacturing step of a battery electrode according to a second embodiment.
Figure 12:
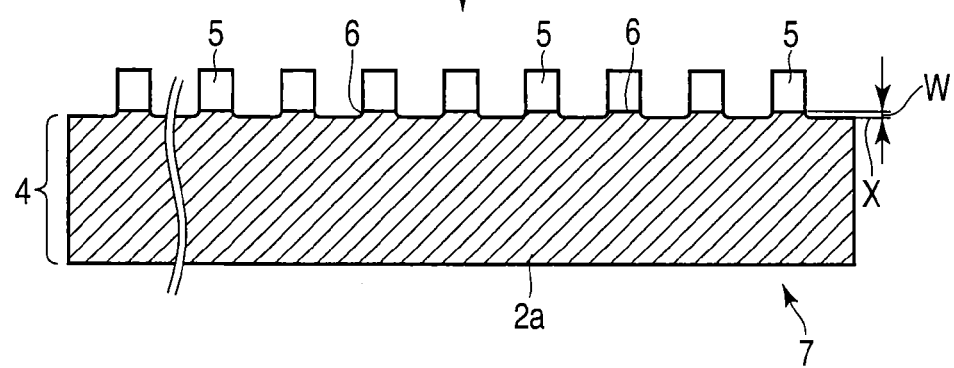
FIG. 12 is a plan view of the battery electrode according to the second embodiment.

FIGS. 11 and 12 are schematic views showing an electrode used in the rolled-up electrode group, and a manufacturing step thereof.

As shown in FIG. 11, both surfaces of the elongated belt-like metallic foil 1 excluding the both side edge parts in the longitudinal direction, and the one short side part are coated with slurry containing an active material, and thereafter the resultant is dried, whereby active material-coated parts (active material-containing layers) 2a and 2b are formed. A part at which the active material-coated parts 2a and 2b are not formed, and the metallic foil 1 is exposed is called an uncoated part 3. At the uncoated part 3a with a larger width of the two uncoated parts 3a and 3b positioned at both side edge parts of the metallic foil 1, a plurality of tabs 5 are formed in the cutting step to be described later.

The coating position of the active material-coated part 2a formed on the one surface of the metallic foil 1 is deviated from the coating position of the active material-coated part 2b formed on the opposite surface of the metallic foil 1, and the deviation amount is set within a range of 3 mm or less.

As shown in FIG. 12, in the cutting step to be carried out subsequently, an electrode main body 4 (current collector on both surfaces of which active material-containing layers are formed) is punched out from the part on which the active material-coated parts 2a and 2b are formed, and the uncoated parts 3a and 3b, and active material-coated parts 2a and 2b are punched out so that the active material-containing layer can be left in the area including the proximal end part X of the tab 5. As a result of this, an electrode 7 including the electrode main body 4, and a plurality of tabs 5 extending from one side edge of the electrode main body 4 is obtained. The plurality of tabs 5 are arranged at predetermined intervals along the side edge of the electrode main body 4.

Of the active material-containing layer, the part at which the coating positions are deviated from each other can be used for the proximal end part area of the tab 5, and hence both surfaces of both side parts of the electrode main body 4 can be covered with the active material-containing layers. As for the remaining two sides (short sides), the part at which the active material-coated part is formed on one surface only is cut off. As a result of this, both surfaces of the current collector are covered with the active material-containing layers.

Thereafter, by pressing the current collector in the thickness direction of the active material-coated part, it is possible to use only the part with uniform coating, and uniform pressing density as the electrode, and reduce unevenness in capacity. Further, an active material-uncoated part of the electrode is eliminated to the utmost, and hence this is advantageous from the viewpoint of capacity density. Furthermore, by cutting off a part at which one side only is coated, the adhesion of the current collector is uniform, and electrode exfoliation can be suppressed.

The pressing is carried out after the tab 5 is punched out from the uncoated part 3a, and hence a difference between the extension of the metallic foil of the part at which the active material-coated part is formed on each of both surfaces at the time of the pressing, and the extension of the tab 5 at the time of the pressing becomes small, and hence it is possible to avoid distortion or bend of the electrode at the time of pressing. When the active material-coated part is cut out, a burr is caused in some cases. By carrying out the pressing after the cutting, it is possible to smooth the burr.

In the electrode 7 manufactured by the above manufacturing method, the active material-containing layers are formed in the area 6 including the proximal end part X of the tab 5, and hence it is possible to compensate for the strength of the metallic foil to resist the bending of the tab 5. Accordingly, it becomes easy to handle the electrode when the electrode group is manufactured. Further, by restricting the width W of the area to 3 mm or less from the proximal end of the tab 5, it becomes possible to sufficiently enhance the strength of the metallic foil 1 to resist the bending of the tab.

Third Embodiment

Figure 13:
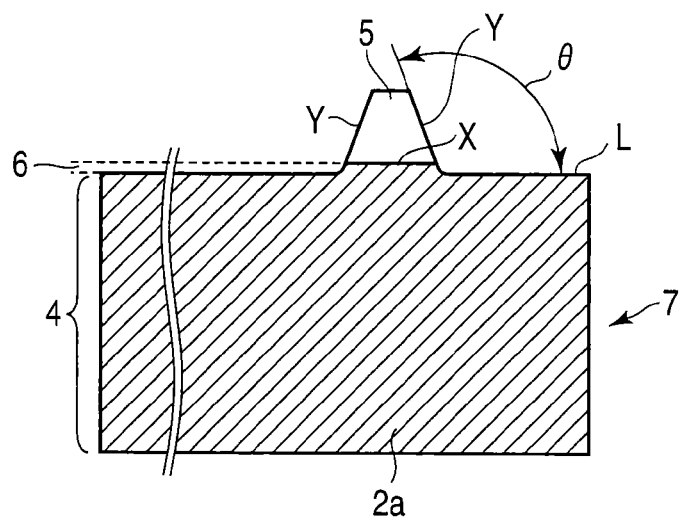
FIG. 13 is a plan view showing a battery electrode according to a third embodiment.

In the first and second embodiments described previously, in the tab 5, the two sides Y opposed to each other may be inclined at an angle θ exceeding 90° toward the side edge (side parallel with the rolling direction) L of the electrode main body 4 as shown in FIG. 13. The tab 5 including such two sides Y has a trapezoidal shape, and a width of the proximal end part X thereof becomes larger than a width of the distal end thereof. Accordingly, it becomes possible to prevent the electrode from being cut with the joint part of the tab 5 being a starting point, and handle the electrode easily when the electrode is treated to manufacture the rolled-up electrode group. Further, each of both corner parts of the proximal end part of the tab is formed into a rounded shape. In this case, it is possible to further improve the strength of the tab 5.

The electrode 7 for the secondary battery described above can be applied to a non-aqueous electrolyte battery electrode.

As the metallic foil, for example, aluminum foil, aluminum alloy foil, copper foil, and the like can be used. It is desirable that the average crystal grain size of the aluminum foil or aluminum alloy foil be made 50 μm or less. The more desirable average crystal grain size is 3 μm or less. Further it is desirable that the lower limit of the average crystal grain size be made 0.01 μm.

The average crystal grain size of aluminum or an aluminum alloy is measured by the method described below. The structure of the current collector surface is observed by using a metallurgical microscope, the number n of crystal grains existing in a visual field of 1 mm×1 mm is measured, and the average crystal grain area S (μm$^2$) is calculated by using the following formula (0).

$$S=(1\times 10^6)/n \quad (0)$$

Here, the value expressed by (1×10$^6$) is the visual field area (μm$^2$) of 1 mm×1 mm, and n is the number of crystal grains. By using the obtained average crystal grain area S, the average crystal grain size d (μm) was calculated from the following formula (1). Such calculation of the average crystal grain size d was carried out for five positions (five visual fields), and the average was set as the average crystal grain size. It should be noted that the estimated error is about 5%.

$$d=2(S/\pi)^{1/2} \quad (1)$$

It is desirable that the purity of aluminum be 99.99% or more for the sake of improvement in corrosion resistance, and a high degree of enhancement in strength. As the aluminum alloy, an alloy containing, in addition to Al, at least one kind of element selected from a group constituted of Fe, Mg, Zn, Mn, and Si is desirable. For example, an Al—Fe alloy, Al—Mn-based alloy, and Al—Mg-based alloy can obtain further higher strength than Al. On the other hand, it is desirable that a content of a transition metal in aluminum and an aluminum alloy such as Ni, Cr, and the like be made 100 ppm or less (including 0 ppm). It is desirable that the aluminum content in the aluminum alloy be made 95% by weight or more, and 99.5% by weight or less. The more desirable aluminum content is 98% by weight or more, and 99.5% by weight or less.

It is desirable that the thickness of the metallic foil be 20 μm or less for the sake of a high degree of enhancement in capacity. The more desirable range is 12 μm or less. Further, it is desirable that the lower limit of the thickness be made 3 μm.

As the negative electrode active material, a substance that occludes/discharges lithium can be used, and examples of such a substance include a carbonaceous substance, metallic oxide, metallic sulfide, metallic nitride, and alloy.

Examples of the carbonaceous substance include a graphitic material or carbonaceous material (for example, graphite, coke, carbon fiber, spheroidal carbon, thermal decomposition gaseous phase carbonaceous substance, resin burned substance, and the like).

It is desirable that the lithium occlusion potential of the negative electrode active material be 0.4 V (vs.Li/Li+) or more. As a result of this, it is possible to suppress the progress in the alloying reaction of the aluminum component and lithium of the negative electrode current collector, and micronization of the negative electrode current collector. Furthermore, it is desirable that the lithium occlusion potential be within a range from 0.4 V (vs.Li/Li+) to 3 V (vs.Li/Li$^+$). As a result of this, it is possible to improve the battery voltage. The more desirable potential range is from 0.4 V (vs.Li/Li$^+$) to 2 V (vs.Li/Li$^+$).

Examples of the metallic oxide capable of occluding lithium within the potential range from 0.4 V (vs.Li/Li$^+$) to 3 V (vs.Li/Li$^+$) include a titanium oxide such as TiO$_2$, and the like, lithium-titanium oxide such as {Li$_{4+x}$Ti$_5$O$_{12}$ (x is within the range of −1≤x≤3) of the spinel type, (Li$_2$Ti$_3$O$_7$) of the ramsdellite type, and the like, tungsten oxide such as WO$_3$, and the like, amorphous tin oxide such as SnB$_{0.4}$P$_{0.6}$O$_{3.1}$, and the like, tin-silicon oxide such as SnSiO$_3$, and the like, and silicon oxide such as SiO, and the like.

Examples of the metallic sulfide capable of occluding lithium within the potential range from 0.4 V (vs.Li/Li+) to 3 V (vs.Li/Li+) include a titanium sulfide such as TiS$_2$, and the like, molybdenum sulfide such as MoS$_2$, and the like, and ferric sulfide such as FeS, FeS$_2$, Li$_x$FeS$_2$, and the like.

Examples of the metallic nitride capable of occluding lithium within the potential range from 0.4 V (vs.Li/Li$^+$) to 3 V (vs.Li/Li$^+$) include a lithium-cobalt nitride such as Li$_x$Co$_y$N (0<x<4, 0<y<0.5), and the like.

As the negative electrode active material, lithium titanate is desirable. This is because the lithium occlusion potential of lithium titanate is about 1.5 V (vs.Li/Li$^+$), and lithium titanate is a material electrochemically stable with respect to the aluminum foil current collector or aluminum alloy foil current collector.

The slurry containing the negative electrode active material is prepared by suspending, for example, a negative electrode material, conductive agent, and binding agent in an appropriate solvent.

As the conductive agent for enhancing the electron conductivity, and reducing the contact resistance associated with the contact with the current collector, a carbon material can be used. Examples of the carbon material include acetylene black, carbon black, coke, carbon fiber, graphite, and the like.

Examples of the binding agent for binding the active material and conductive agent to each other include polytetrafluoroethylene (PTFE), polyvinylidene-fluoride (PVdF), fluorine-containing rubber, styrene-butadiene rubber, and the like.

On the other hand, examples of the positive electrode active material include an oxide, sulfide, polymer, and the like. Examples of the oxide include manganese dioxide ($MnO_2$), iron oxide, copper oxide, and nickel oxide, a lithium-manganese composite oxide such as $Li_xMnO_2O_4$, $Li_xMnO_2$, and the like, lithium-nickel composite oxide such as $Li_xNiO_2$, and the like, lithium-cobalt composite oxide such as $Li_xCoO_2$, and the like, lithium-nickel-cobalt composite oxide such as $LiNi_{1-y}Co_yO_2$, and the like, lithium-manganese-cobalt composite oxide such as $LiMn_yCo_{1-y}O_2$, and the like, spinel-type lithium-manganese-nickel composite oxide such as $Li_xMn_{2-y}Ni_yO_4$, and the like, lithium-phosphorus oxide with an olivine-structure such as $Li_xFePO_4$, $Li_xFe_{1-y}Mn_yPO_4$, $Li_xCoPO_4$, and the like, iron sulfate such as $Fe_2(SO_4)_3$, and the like, and vanadium oxide such as $V_2O_5$, and the like. It should be noted that it is desirable that each of x, and y be within a range of 0 to 1.

Examples of the polymer include a conductive polymer such as polyaniline, and polypyrrole, and a disulfide-based polymer material, and the like. In addition, sulfur (5), carbon fluoride, and the like can also be used. Examples of the desirable positive electrode active material include a lithium-manganese composite oxide, lithium-nickel composite oxide, lithium-cobalt composite oxide, lithium-nickel-cobalt composite oxide, spinel-type lithium-manganese-nickel composite oxide, lithium-manganese-cobalt composite oxide, lithium iron phosphate, and the like. By using these active materials, a high positive electrode voltage is obtained.

The slurry containing a positive electrode active material is prepared by suspending, for example, the positive electrode active material, conductive agent, and binding agent in an appropriate solvent.

Examples of the conductive agent for enhancing the electron conductivity, and reducing the contact resistance associated with the contact with the current collector include acetylene black, carbon black, graphite, and the like.

Examples of the binding agent for binding the active material and conductive agent to each other include polytetrafluoroethylene (PTFE), polyvinylidene-fluoride (PVdF), fluorine-containing rubber, and the like.

EXAMPLES

Examples of the present invention will be described below with reference to the drawings described previously. It should be noted that the present invention is not limited to following examples to be described below as far as the spirit of the present invention is not exceeded.

A description will be given below by taking a non-aqueous electrolyte battery negative electrode in which lithium titanate is used as the active material as an example.

Example 1

Powder of lithium titanate ($Li_4Ti_5O_{12}$) which is an active material with the lithium occlusion potential of 1.55 V (vs.Li/$Li^+$), and the spinel structure, carbon powder serving as a conductive agent, and polyvinylidene-fluoride (PVdF) serving as a binding agent were compounded at weight ratios of 90:7:3, and the resultant was dispersed in an n-methylpyrrolidone (NMP) solvent to prepare slurry. Both sides of aluminum foil (purity: 99.99%) with a thickness of 15 μm, and average crystal grain size of 1 μm were coated with the slurry, and thereafter the coated slurry was dried.

At this time, a slurry-uncoated part with a width of 35 mm was left at one side edge part of the metallic foil, a slurry-uncoated part with a width of 15 mm was left at the other side edge part thereof, the coating width (coating width parallel with the short sides of the metallic foil) of the slurry was made 70 mm, and the deviation of each of the active material coating positions on both surfaces from each other was adjusted to 3 mm or less.

Subsequently, the metallic foil on which the active material-containing layers were formed was cut out to form a plurality of tabs at the uncoated part with the width of 35 mm. At this time, the metallic foil was cut out in such a manner that the uncoated part was not left at parts other than the tabs, and an active material-coated part (active material-containing layer) with a width of 3 mm or less was left at a proximal end part of each of the tabs. Further, the other side edge part was also cut out to leave no uncoated part thereon. Accordingly, it was necessary to apply the slurry in a size somewhat larger than the cutting size.

Subsequently, the active material-containing layer was pressed in the thickness direction, and then was cut out, whereby a negative electrode of the structure shown in FIG. 13 described previously with a width of 60 mm, length of 4500 mm, and thickness of the active material-containing layer of 35 μm was obtained. The density of the active material-containing layer part was about 2.3 g/cm³.

Example 2

A negative electrode identical with that described in example 1 was manufactured except for that a width W of an active material-containing layer formed at a proximal end part of a tab is changed as shown in Table 3. It should be noted that that the width W of the active material-containing layer is 0 mm implies that no active material-containing layer is formed at a part from the proximal end of the tab to the distal end thereof. Further, that the width W of the active material-containing layer is −1 mm implies that a distance between an end edge of the active material-containing layer formed on the electrode main body and the proximal end of the tab is 1 mm.

A separator constituted of a porous film made of polyethylene was interposed between each negative electrode and positive electrode, and these members were rolled up into a flat spiral shape, whereby an electrode group was manufactured. The manufacturing method of the positive electrode is as follows.

Lithium-cobalt oxide ($LiCoO_2$) serving as an active material, graphite powder serving as a conductive agent, and polyvinylidene-fluoride (PVdF) serving as a binding agent were compounded at weight ratios of 87:8:5, and the resultant was dispersed in an n-methylpyrrolidone (NMP) solvent to prepare slurry. Aluminum foil (purity: 99.99%) with a thickness of 15 μm, and average crystal grain size of 10 μm was coated with the slurry, thereafter the coated slurry was dried, and was then pressed, whereby a positive electrode with electrode density of 3.5 g/cm³ was manufactured.

The rate of occurrence of bending of the lead part in the manufacturing step of the rolled-up electrode group is shown in Table 3 below.

TABLE 3

| Width W of active material-containing Layer (mm) | Rate of occurrence of bending of lead part (%) |
| --- | --- |
| 3 | 0.00 |
| 2 | 0.02 |
| 1 | 0.05 |
| 0 | 0.11 |
| −1 | 0.12 |

As is evident from Table 3, when 3 mm or less of the width of the active material-containing layer formed at the proximal end part of the tab is left, the rate of occurrence of the bending of the lead part is reduced, and the yield can be improved.

Example 3

In the negative electrode of example 1 described previously, as for the coating positions of the active material-containing layers formed on both surfaces of the metallic foil, a considerable positional deviation occurs. The deviation of each of the coating positions on both surfaces from each other was set as 3 mm. Then, the coating width (coating width in the short side direction excluding the tab), and the electrode width (width in the short side direction excluding the tab) after the cutting were changed as shown in Table 4, and the ratio of the coating width to the total width of both surfaces of the electrode at that time was obtained. The results are shown in Table 4.

TABLE 4

| Electrode width after cutting (excluding lead part) | Coating width of slurry (excluding lead part) | Deviation of coating surfaces on both surfaces | Ratio of active material coating width to total width of both surfaces of electrode |
| --- | --- | --- | --- |
| 60 mm | 70 mm | 3 mm | 100% |
| 60 mm | 60 mm | 3 mm | 97.5% |
| 60 mm | 50 mm | 3 mm | 83% |
| 40 mm | 50 mm | 3 mm | 100% |
| 40 mm | 40 mm | 3 mm | 96.25% |
| 40 mm | 30 mm | 3 mm | 75% |
| 20 mm | 30 mm | 3 mm | 100% |
| 20 mm | 20 mm | 3 mm | 92.5% |
| 20 mm | 10 mm | 3 mm | 50% |

When the coating width is made 60 mm for the cutting width 60 mm of the electrode, the deviation of the coating positions is 3 mm, and hence by cutting out the electrode to leave no uncoated part on one surface, an uncoated part with a width of 3 mm is left on the other surface. The cutting width is 60 mm on each of the surfaces, and the ratio of the uncoated part to the total of these widths is calculated as follows; uncoated part width 3 mm/(cutting width of front side 60 mm+cutting width of reverse side 60 mm)=2.5%, this being the reduction in capacity. As shown in the results of Table 4, the narrower the electrode width after the cutting, the greater the influence is.

In this example, although the coating width is set redundantly larger than the electrode width to be obtained after the cutting by 10 mm, when the positional deviation of the coating positions of both surfaces is 3 mm or less, if the coating width is provided with minimum redundancy of 3 mm, the same effect can be obtained. It should be noted that when the coating width is set to be provided with redundancy of 10 mm with respect to the electrode width to be obtained after the cutting, the width of the active material-containing layer from the proximal end of the tab becomes 10 mm.

Further, at a part at which the active material-containing layer is formed on one side only, the density of the active material is low, and hence the layer is liable to exfoliate. When an exfoliated flake of the active material is mixed in the inside of the battery, there is the possibility of a failure being caused due to an internal short-circuit.

Example 4

A difference in bending of the tab based on a difference in shape of the tab was examined.

When each of the two sides of the tab of the negative electrode of example 1 described previously opposed to each other is inclined with respect to the side edge (side edge in the longitudinal direction) at an angle smaller than 90°, for example, 80°, there occurs a case where the negative electrode is cut while the positive electrode, separator, and negative electrode are rolled up, and there has been the possibility of the operating rate being reduced.

When each of the two sides Y of the tab opposed to each other was inclined with respect to the side edge at an angle θ exceeding 90°, for example, 100°, the number of times of breakage of the negative electrode during the rolling decreased, and the operating rate was improved. It is desirable that the angle θ be as large as possible. However, in the case where it is desired to make the width of the tab 5 small due to the design restriction, it was confirmed that by forming the corner part on the proximal end side of the tab into an arcuate shape, the same effect could be obtained when the angle formed by each of the sides is 90° or larger. It should be noted that it was confirmed that even when the proximal end side corner part of the tab 5 was formed into an arcuate shape, if there was any part at which an angle formed by each of the two sides of the tab opposed to each other and the side parallel with the rolling direction (long side direction) was smaller than 90°, the negative electrode was cut with the part being a starting point.

Example 5

Examination of Difference in Rate of Occurrence of Burr Due to Order of Cutting Step and Pressing Step When the active material-containing layer of the electrode is cut, a minute burr occurs at the cutting surface, and causes a failure such as a short circuit inside the battery in some cases.

As shown in example 1 described previously, the metallic foil is coated with slurry containing the active material, the resultant is thereafter dried, then is cut out, and then is subjected to a pressing step, whereby the burr at the cutting surface is smoothed, and it is possible to reduce the occurrence of failures such as a short circuit, and the like inside the battery.

As has been described above in detail, according to the battery electrode, and method of manufacturing the same associated with this embodiment, it is possible to provide an electrode capable of reducing defects of tab-bending, and a method of manufacturing the electrode. Further, it is possible to provide a secondary battery suitable for a large current use which realizes improvement in electrode capacity density, and reduction in capacity unevenness, and in which internal defects due to exfoliation of the electrode active material and burrs are largely suppressed.

The present invention is not limited directly to the embodiment described above, and its components may be embodied in modified forms without departing from the spirit of the invention. Further, various inventions may be formed by suitably combining a plurality of components described in connection with the foregoing embodiment.

What is claimed is:

1. A battery electrode comprising:
    a current collector comprising a metallic foil;
    at least one tab comprising the metallic foil, and protruding from the current collector; and
    a layer comprising an active material, wherein the layer is disposed on two surfaces of the current collector and on an area comprising a proximal end part of the tab on a current collector side;
    wherein a weight per unit area of the current collector is W1, a weight per unit area of the tab is W2, and W1 and W2 satisfy a relationship of 0.995<W2/W1<0.999.

2. The battery electrode of claim 1, wherein a width of the area is 3 mm or less from the proximal end part of the tab on the current collector side.

3. The battery electrode of claim 1, wherein a plurality of the tabs protrude from a long side of the current collector.

4. The battery electrode of claim 3, wherein each tab has two sides opposed to each other, and each of the two sides forms an angle equal to or greater than 90° with the long side of the current collector.

5. The battery electrode of claim 1, wherein the metallic foil comprises aluminum.

6. The battery electrode of claim 5, wherein a purity of aluminum in the metallic foil is at least 99.99%.

7. The battery electrode of claim 5, wherein an average crystal grain size of the metallic foil is 0.01 to 50 μm.

8. The battery electrode of claim 5, wherein an average crystal grain size of the metallic foil is 0.01 to 3 μm.

9. The battery electrode of claim 1, wherein the metallic foil comprises an alloy of aluminum and at least one element selected from the group consisting of Mg, Ti, Zn, Mn, Fe, Cu and Si.

10. The battery electrode of claim 9, wherein the alloy comprises 95 to 99.5 wt % aluminum.

11. The battery electrode of claim 9, wherein the alloy comprises 98 to 99.5 wt % aluminum.

12. The battery electrode of claim 1, wherein a thickness of the metallic foil is 3 to 20 μm.

13. The battery electrode of claim 1, wherein a thickness of the metallic foil is 3 to 12 μm.

14. The battery electrode of claim 1, wherein the active material has a lithium occlusion potential of 0.4 V or more versus Li/Li+.

15. The battery electrode of claim 1, wherein the active material has a lithium occlusion potential of 0.4 to 3 V versus Li/Li+.

16. The battery electrode of claim 1, wherein the active material is at least one selected from the group consisting of a titanium oxide, a lithium-titanium oxide, a tungsten oxide, an amorphous tin oxide, a tin-silicon oxide, a silicon oxide, a titanium sulfide, a molybdenum sulfide, a ferric sulfide, a lithium-cobalt nitride, manganese dioxide, an iron oxide, a copper oxide, a nickel oxide, a lithium-manganese composite oxide, a lithium-nickel composite oxide, a lithium-cobalt composite oxide, a lithium-nickel-cobalt composite oxide, a lithium-manganese-cobalt composite oxide, a spinel-type lithium-manganese-nickel composite oxide, a lithium-phosphorus oxide, an iron sulfate, and a vanadium oxide.

17. The battery electrode of claim 1, wherein the active material is lithium titanate.

18. The battery electrode of claim 1, wherein the active material is lithium-cobalt oxide.

19. A method of manufacturing the battery electrode of claim 1, the method comprising:
    forming the layer comprising the active material on two surfaces of the metallic foil except one end part at which the tab is to be formed;
    cutting out the metallic foil, on two surfaces of which the active material layer is disposed, to form the current collector and the tab; and
    pressing the layer in a thickness direction thereof.

* * * * *

UNITED STATES PATENT AND TRADEMARK OFFICE
CERTIFICATE OF CORRECTION

PATENT NO. : 8,642,209 B2  
APPLICATION NO. : 13/670109  
DATED : February 4, 2014  
INVENTOR(S) : Hideaki Morishima et al.

Page 1 of 1

It is certified that error appears in the above-identified patent and that said Letters Patent is hereby corrected as shown below:

On the Title Page

Please remove the following item from the Letters Patent  
"(71) Applicant: Hiroshi Miyauchi, Tokyo (JP)"

Signed and Sealed this  
Twentieth Day of May, 2014

Michelle K. Lee  
*Deputy Director of the United States Patent and Trademark Office*